(12) United States Patent
Osaki et al.

(10) Patent No.: US 9,050,584 B2
(45) Date of Patent: Jun. 9, 2015

(54) PRODUCTION METHOD OF BASE METAL CATALYST FOR EXHAUST GAS PURIFICATION

(71) Applicants: Mayuko Osaki, Toyota (JP); Michio Miura, Toyota (JP)

(72) Inventors: Mayuko Osaki, Toyota (JP); Michio Miura, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/370,522

(22) PCT Filed: Jan. 15, 2013

(86) PCT No.: PCT/JP2013/050582
§ 371 (c)(1),
(2) Date: Jul. 3, 2014

(87) PCT Pub. No.: WO2013/108756
PCT Pub. Date: Jul. 25, 2013

(65) Prior Publication Data
US 2014/0342902 A1    Nov. 20, 2014

(30) Foreign Application Priority Data
Jan. 20, 2012 (JP) .................. 2012-010213

(51) Int. Cl.
*B01J 23/00* (2006.01)
*B01J 23/83* (2006.01)
(Continued)

(52) U.S. Cl.
CPC ............ *B01J 23/83* (2013.01); *B01D 53/8628* (2013.01); *B01D 53/9413* (2013.01); *B01D 2255/20753* (2013.01); *B01D 2255/20761* (2013.01); *B01D 2255/407* (2013.01); *B01D 2255/65* (2013.01); *F01N 3/281* (2013.01); *F01N 3/2828* (2013.01); *F01N 2510/06* (2013.01); *F01N 2570/14* (2013.01); *B01J 37/038* (2013.01); *B01J 23/02* (2013.01); *B01J 23/06* (2013.01); *B01J 23/10* (2013.01); *B01J 23/22* (2013.01); *B01J 23/28* (2013.01); *B01J 23/30* (2013.01);
(Continued)

(58) Field of Classification Search
CPC .......... B01J 21/08; B01J 21/066; B01J 23/72; B01J 23/755; B01J 23/83
USPC .................................... 502/242, 325
See application file for complete search history.

(56) References Cited

U.S. PATENT DOCUMENTS

| 6,548,032 B1 * | 4/2003 | Barthe et al. ............... 423/213.2 |
| 2007/0104623 A1 * | 5/2007 | Dettling et al. ............... 422/177 |

FOREIGN PATENT DOCUMENTS

| JP | 2000-185232 | 7/2000 |
| JP | 2007-275709 | 10/2007 |
| JP | 2008-229459 | 10/2008 |

*Primary Examiner* — Colleen Dunn
*Assistant Examiner* — Haytham Soliman
(74) *Attorney, Agent, or Firm* — Finnegan, Henderson, Farabow, Garrett & Dunner, LLP

(57) ABSTRACT

To provide a production method of a base metal catalyst for exhaust gas purification and with a catalyst activity, in which a base metal-supported catalyst is uniformly supported by a honeycomb substrate. A production method of a catalyst for exhaust gas purification, comprising the steps of preparing a honeycomb substrate having a plurality of cells, preparing a base metal-supported catalyst comprising a carrier supporting a metal containing a base metal having an exhaust gas purification performance, preparing a slurry having a pH of 7 or more by dispersing the base metal-supported catalyst in an aqueous solution, and introducing the slurry to a partition wall surface of the honeycomb substrate.

7 Claims, 4 Drawing Sheets

(51) Int. Cl.

| | | |
|---|---|---|
| *B01D 53/86* | (2006.01) | |
| *B01D 53/94* | (2006.01) | |
| *B01J 37/03* | (2006.01) | |
| *B01J 23/02* | (2006.01) | |
| *B01J 23/06* | (2006.01) | |
| *B01J 23/10* | (2006.01) | |
| *B01J 23/22* | (2006.01) | |
| *B01J 23/28* | (2006.01) | |
| *B01J 23/30* | (2006.01) | |
| *B01J 23/34* | (2006.01) | |
| *B01J 23/72* | (2006.01) | |
| *B01J 23/745* | (2006.01) | |
| *B01J 23/75* | (2006.01) | |
| *B01J 23/755* | (2006.01) | |
| *B01J 23/78* | (2006.01) | |
| *B01J 35/02* | (2006.01) | |
| *B01J 35/04* | (2006.01) | |
| *B01J 21/06* | (2006.01) | |
| *B01J 21/08* | (2006.01) | |
| *F01N 3/28* | (2006.01) | |

(52) U.S. Cl.
CPC ............... *B01J 23/34* (2013.01); *B01J 23/72* (2013.01); *B01J 23/745* (2013.01); *B01J 23/75* (2013.01); *B01J 23/755* (2013.01); *B01J 23/78* (2013.01); *B01J 35/023* (2013.01); *B01J 35/04* (2013.01); *B01J 21/066* (2013.01); *B01J 21/08* (2013.01)

PRODUCTION METHOD OF BASE METAL CATALYST FOR EXHAUST GAS PURIFICATION

CROSS-REFERENCE TO RELATED APPLICATIONS

This application is a national phase application of International Application No. PCT/JP2013/050582, filed Jan. 15, 2013, and claims the priority of Japanese Application No. 2012-010213, filed Jan. 20, 2012, the content of both of which is incorporated herein by reference.

TECHNICAL FIELD

The present invention relates to a production method of a base metal catalyst for exhaust gas purification, and more specifically refers to a production method of a base metal catalyst for exhaust gas purification and with the capability to exhibit $NO_x$ purification performance activity, in which a base metal-supported catalyst is coated on a honeycomb substrate

BACKGROUND ART

Recently, from the viewpoint of global environmental conservation, the control of exhaust gases has been strengthened on a worldwide scale year after year. As a countermeasure, catalysts for exhaust gas purification have been used in internal combustion engines. Noble metals such as Pt, Au, and Rh have been used as catalyst components in exhaust gas purification catalyst to efficiently remove HC, CO, and $NO_x$ in an exhaust gas. However, these noble metals have the drawbacks that the producing countries are limited to specific countries and resources are running out.

Other than noble metals, base metals have been studied as the metal of a catalyst for exhaust gas purification. However, a base metal catalyst for exhaust gas purification has not been put to practical use, due to its lower exhaust gas purification performance activity, specifically, $NO_x$ purification performance activity lower than a noble metal catalyst for exhaust gas purification, which comprises a novel metal.

One of the reasons why a base metal catalyst for exhaust gas purification is not used in motor vehicles, for example, gasoline powered vehicles or diesel powered vehicles, is considered as follows: It is not easy to uniformly coat a honeycomb substrate with a base metal-supported catalyst for $NO_x$ purification upon production of a catalyst comprising a honeycomb substrate coated with a base metal-supported catalyst for $NO_x$ purification in which an active species is supported by a carrier.

There have been various proposals for the technology for coating a honeycomb substrate with a metal-supported catalyst for exhaust gas purification.

For example, Patent Document 1 describes a production method of a catalyst for exhaust gas purification, comprising the step of introducing a wash coat slurry to a honeycomb substrate, in which the wash coat slurry comprises carrier particles having a volume average particle diameter of 20 to 100 μm, a viscosity modifier of an acid such as acetic acid or an inorganic particle dispersant such as a sol, and a solvent, and the wash coat slurry has a viscosity of 5 to 10 mPas at 25° C. Moreover, as a specific example, Patent Document 1 indicates that the slurry was prepared by mixing a noble metal-supported catalyst comprising Pt and Rh supported on a $\gamma$-$Al_2O_3$ powder carrier, with water and an alumina sol (acetic acid based), and that the slurry was introduced from the end face of a monolith substrate, dried, and fired to obtain a catalyst for exhaust gas purification. It is considered that the slurry was acidified with acetic acid.

Further, Patent Document 2 describes an exhaust gas cleaning device comprising a wall flow-structured filter material having a porous cell partition and a base metal support formed on said cell partition and comprised of a PM oxidation catalyst, which consists of a base metal selected from alkali metals or lanthanoid elements and is capable of oxidizing PM. Moreover, as a specific example, Patent Document 2 indicates a method in which a slurry of a porous oxide powder, such as a $\gamma$-$Al_2O_3$ powder and a $CeO_2$ powder, together with a binder component such as an alumina sol, and water, is prepared, adhered to a cell partition, thereafter, fired to form a coating layer, the coating layer is allowed to absorb an aqueous solution of a base metal acetate, and the acetate is decomposed so that a base metal such as potassium or cesium is supported to form a base metal-supported portion.

PRIOR ART DOCUMENTS

Patent Documents

[Patent Document 1] Japanese Unexamined Patent Publication (Kokai) No. 2007-275709
[Patent Document 2] Japanese Unexamined Patent Publication (Kokai) No. 2008-229459

SUMMARY OF THE INVENTION

Problem to be Solved by the Invention

However, if the conventionally well-known technology mentioned above is applied to the production method of a base metal catalyst for exhaust gas purification, it would be difficult to obtain a catalyst having an exhaust gas purification catalyst activity. Further, the conventionally well-known base metal catalysts mentioned above have no or low exhaust gas purification catalyst activity.

Therefore, the object of the present invention is to provide a production method of a base metal catalyst for exhaust gas purification and with the capability to exhibit an exhaust gas purification catalyst activity, in which a base metal-supported catalyst is uniformly supported by a honeycomb substrate.

Means for Solving the Problem

As a result of keen research to attain the object, the present inventors found that the formation of a base metal catalyst for exhaust gas purification and with the capability to provide an exhaust gas purification catalyst activity requires that a base metal-supported catalyst comprising a carrier supporting a metal having an exhaust gas purification catalyst activity be uniformly introduced to a partition wall of a honeycomb substrate and be supported, but if a conventional slurry is used, the support by uniformly introducing a base metal-supported catalyst to a partition wall of a honeycomb substrate would be difficult. As a result of further research, the present inventors have completed the present invention.

Namely, the present invention relates to a production method of a catalyst for exhaust gas purification, comprising:
preparing a honeycomb substrate having a plurality of cells;
preparing a base metal-supported catalyst comprising a carrier supporting a metal containing a base metal having an exhaust gas purification performance;
preparing a slurry having a pH of 7 or more by dispersing the base metal-supported catalyst in an aqueous solution; and introducing the slurry to a partition wall surface of the honeycomb substrate.

Effect of the Invention

According to the present invention, a base metal-supported catalyst is uniformly supported by a honeycomb substrate whereby a base metal catalyst for exhaust gas purification and with a catalyst activity can be easily obtained.

MODE FOR CARRYING OUT THE INVENTION

Figure 1:
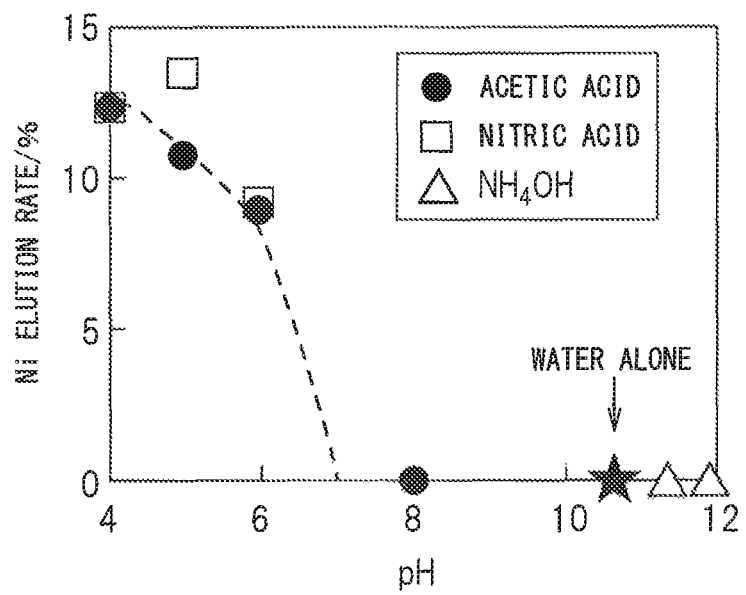
FIG. 1 is a graph indicating the relationship between the elution ratio of the base metal in water and the pH in the embodiments of the present invention.

The present invention includes an inevitable step of introducing a slurry to a partition wall surface of a honeycomb substrate having a plurality of cells, in which the slurry has a pH of 7 or more and comprises an aqueous solution having dispersed therein a base metal-supported catalyst comprising a carrier supporting a metal containing a base metal having an exhaust gas purification performance. Thereby, a base metal catalyst for exhaust gas purification and with a catalyst activity can be easily obtained by introducing the base metal-supported catalyst to the partition wall surface of a honeycomb substrate so that the base metal-supported catalyst is uniformly supported.

Specifically, the embodiments of the present invention are described below.
1) The production method, wherein the slurry further comprises an inorganic binder.
2) The production method, wherein the inorganic binder is one of an aluminum salt, a silicone salt, a cerium salt, and a zirconium salt, or a mixture of at least two thereof.
3) The production method, wherein the inorganic binder is contained at a ratio of binder to base metal-supported catalyst (binder/base metal-supported catalyst) of 10 to 30 mass %.
4) The production method, wherein the base metal having an exhaust gas purification performance is iron, cobalt, nickel, molybdenum, tungsten, zinc, magnesium, manganese, vanadium, or copper.
5) The production method, wherein the slurry has a ph of 7 to 9.
6) The production method, wherein the carrier is one selected from $Al_2O_3$, $SiO_2$, MgO, $CeO_2$, $ZrO_2$, and $TiO_2$, a mixture of two or more thereof, or a composite oxide of two or more thereof.
7) The production method, further comprising a step of drying for removing water, and a step of firing the base metal-supported catalyst.
8) The production method, wherein the base metal catalyst for exhaust gas purification is in use for $NO_x$ purification of an exhaust gas.

Below, the present invention will be explained with reference to drawings.

In the present invention, first, a honeycomb substrate having a plurality of cells is prepared.

The honeycomb is a substrate normally used in an exhaust gas purification catalyst, has a partition wall surface in a plurality of cells, and can be formed of a ceramic material such as cordierite, stainless steel etc.

Further, in the present invention, a base metal-supported catalyst comprising a carrier supporting a metal containing a base metal having an exhaust gas purification performance is prepared.

The metal containing a base metal having an exhaust gas purification performance may be, for example, iron, cobalt, nickel, molybdenum, tungsten, zinc, magnesium, manganese, vanadium, copper, or other base metal, and is preferably, nickel, or copper alone, or an alloy thereof with a noble metal, for example, an alloy comprising 50 mass % of the base metals and a noble metal, such as gold, platinum, and silver (preferably gold).

Further, the carrier is not specifically limited, and may be preferably, for example, one selected from $Al_2O_3$, $SiO_2$, MgO, $CeO_2$, $ZRO_2$, and $TiO_2$, which are used as carriers for noble metal catalysts, a mixture of two or more thereof, or a composite oxide of two or more thereof, or an oxide containing an element that can easily change in valence, such as $CeO_2$, for example, Co oxide, Ag oxide, Mn oxide, and Fe oxide, or a highly oxygen ion conductive oxide, such as Zr oxide, La oxide, and Ga oxide.

The amount of a metal containing a base metal supported by a carrier (the metal containing a base metal/the total amount of the supported catalyst) varies depending on the type of base metal or carrier, but normally, is in the range of 0.1 to 30 mass %, for example, in the range of 0.3 to 10 mass %, and specifically, is in the range of 3 to 10 mass %.

In the present invention, a base metal-supported catalyst is dispersed in an aqueous solution to prepare a slurry having a pH of 7 or more.

If the pH of the slurry is less than 7, the base metal is more likely to elute from the base metal-supported catalyst within the slurry as shown in FIG. 1, and the amount of base metal within the base metal-supported catalyst coated on a partition wall surface of a honeycomb substrate decreases or the base metal is unevenly supported, resulting in undesirable decrease in catalyst activity. The pH of the slurry is optimally 7 to 9.

The amount of the base metal-supported catalyst dispersed in the aqueous solution can be set so that the concentration of the base metal-supported catalyst in the slurry is 30 to 70 mass %, specifically, 40 to 50 mass %.

The slurry comprises a base metal-supported catalyst and water as indispensihle components, and may further comprise an additional component if necessary.

The additional component may be a dispersant for maintaining the pH of the slurry at 7 or more, preferably 7 to 9, and/or an inorganic binder for increasing the adhesion between the partition wall surface of a honeycomb substrate and the base metal-supported catalyst, specifically, the adhesion under exhaust gas conditions.

The dispersant may be, for example, a weak acid, such as oxalic acid, tartaric acid, succinic acid, terephthalic acid, benzoic acid, phthalic acid, citric acid, lactic acid, and acetic acid; a basic compound, such as, ammonia ($NH_4OH$), $NaPO_3$, NaOH, KOH, $Ca(OH)_2$, and $Na_2CO_3$, preferably a weakly basic compound, and specifically, ammonia. These may be used singly, or a combination of a weak acid and a base, and preferably, a weak base may be used.

Preferable examples of the combination of a weak acid and a weak base include a combination of lactic acid and ammonia and a combination of citric acid and ammonia.

The inorganic binder is an oxide, hydroxide, ammonium salt, inorganic salt, etc., of silicon or a metal element capable of providing an oxide upon firing, and is preferably stable in a slurry having a pH of 7 or more.

Figure 2:
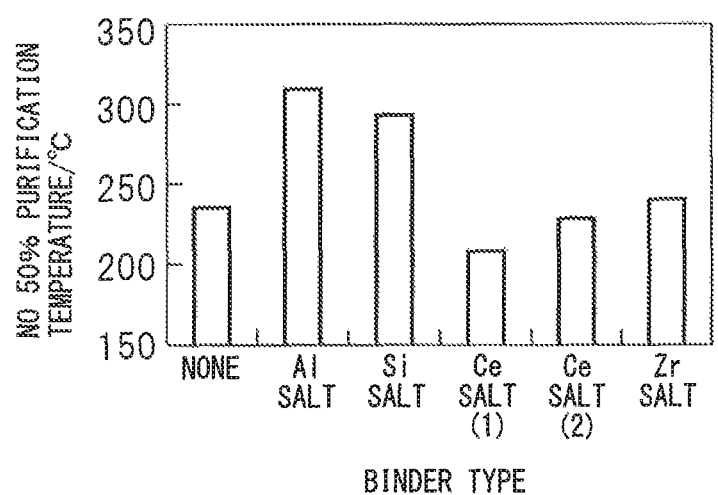
FIG. 2 is a graph indicating by comparison the NO50% purification temperature of a catalyst recovered from a slurry comprising a Ni-supported catalyst versus the type of binder in the examples.
Figure 3:
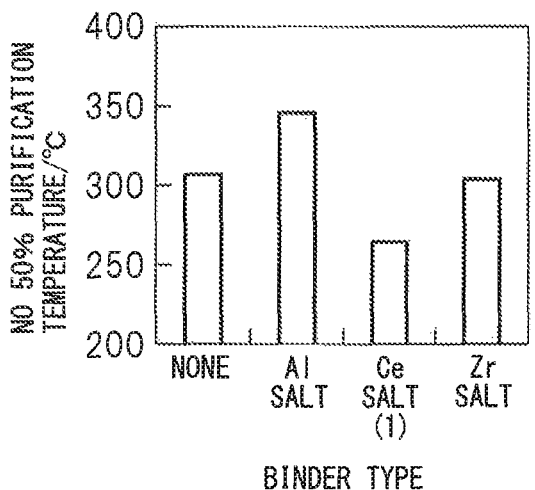
FIG. 3 is a graph indicating by comparison the NO50% purification temperature of a catalyst recovered from a slurry comprising a Cu-supported catalyst versus the type of binder in the examples.

As shown in FIGS. 2 and 3, the inorganic binder may be one of alkali binders, for example, aluminum salt, silicon salt, cerium salt, or zirconium salt, or a mixture of at least two thereof, for example, a mixture of cerium salt and zirconium salt, preferably a mixture comprising cerium salt as a main component. Specifically, the inorganic binder is cerium salt or zirconium salt. Of the two, cerium salt is the more preferable. The salt may be hydroxide, oxide, nitrate, sulfate, ammonium salt, carbonate, etc. These alkali binders may be necessary because a base metal elutes in an aqueous solution if the pH of a slurry is 7 or more.

The method for mixing the inorganic binder with the aqueous solution may be either of a method in which a sol of aluminum, silicon, cerium, or zirconium, specifically, cerium, is preliminarily prepared and the element in the sol form is added to an aqueous solution, or a method in which aluminum salt, silicon salt, cerium salt, or zirconium salt, specifically, cerium salt, is mixed with a base metal-supported catalyst, thereafter, is added with water and a dispersant, and is mixed. The former is the more preferable method.

Figure 4:
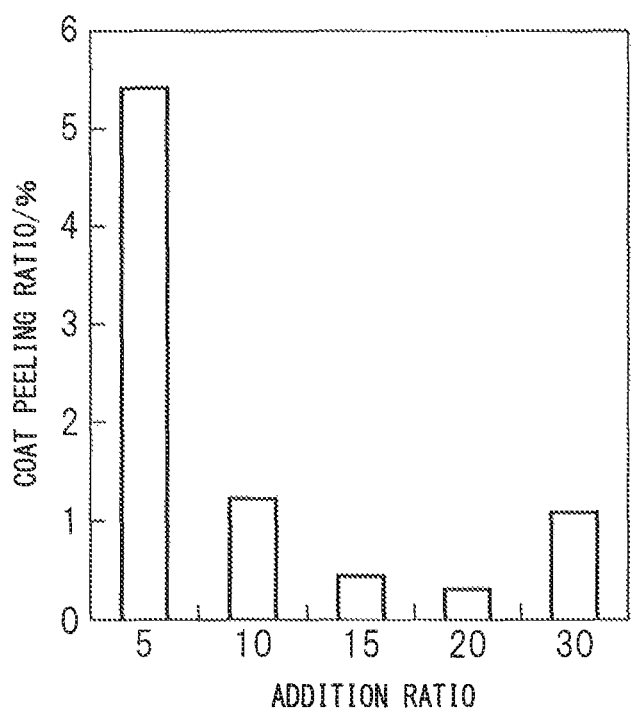
FIG. 4 is a graph indicating by comparison the addition ratio of a binder in a slurry for preparation of a base metal catalyst for exhaust gas purification versus the coat peeling ratio in the embodiment of the present invention.

The amount of the inorganic binder is preferably set so that the ratio of the binder to the base metal-supported catalyst (binder/base metal-supported catalyst) is 10 to 30 mass %. If the amount of the inorganic binder is within the above-mentioned range, the coat peeling ratio measured by the measurement method mentioned below in detail in the examples is low as shown in FIG. 4, namely, the adhesion between a partition wall surface of a honeycomb substrate and a base metal-supported catalyst is high under exhaust gas conditions. Thus, the above-mentioned range is preferable. However, if the amount of the inorganic binder is higher than 30 mass %, coating is difficult, and thus, such an amount is not preferable.

In the present invention, the slurry is introduced to a partition wall surface of a honeycomb substrate.

In the embodiment of the present invention, preferably, a slurry comprising the respective components is milled, for example, by a pulverizer with balls so that the average particle size of the base metal-supported catalyst powder in the slurry is no more than 10 μm, for example, 0.1 to 10 μm, and specifically around 1 to 10 μm. The milled slurry is introduced to the partition wall surface of the honeycomb substrate having a plurality of cells.

Any method may be used as the method for introducing the slurry to the partition wall surface of the honeycomb substrate having a plurality of cells.

The method may be, for example, a method for immersing a honeycomb substrate in a slurry to impregnate the slurry in the honeycomb substrate, a method for immersing a honeycomb substrate in a slurry at a reduced pressure, a method for providing a honeycomb substrate with a mechanical vibration, such as an ultrasound wave, to forcedly impregnate a slurry in the honeycomb substrate, or a method for wash coating a slurry on a honeycomb substrate.

After the slurry is introduced in the aforementioned manner to a partition wall surface of a honeycomb substrate, the honeycomb substrate is normally dried and fired to obtain a base metal catalyst for exhaust gas purification, which comprises a base metal-supported catalyst coated on a surface of a cell partition of a honeycomb substrate.

The drying and firing may be carried out under the conditions in which drying is carried out at 50 to 120° C. for 10 to 60 hours under a circulating air environment, and filing is carried out at 300 to 700° C. for 1 to 5 hours under an air atmosphere, and depending on the material, heating may be further carried out at 300 to 700° C. for 1 to 5 hours under a reducing environment (for example, using $H_2$).

In the base metal catalyst for exhaust gas purification obtained by the present invention, the base metal component in the catalyst fired as mentioned above can be an active species of the base metal if a reducing gas such as hydrogen, CO, and $C_3H_6$, preferably, hydrogen is circulated.

Further, the base metal catalyst for exhaust gas purification obtained by the present invention can be preferably used as a purification catalyst for an internal combustion engine, for example, a motor vehicle.

EXAMPLES

The examples of the present invention are shown below.

In the following examples, the average particle size of a base metal-supported catalyst powder in a slurry was measured using dynamic light scattering (DLS).

Further, the viscosity of the slurry was measured at 25° C. using a viscometer.

Figure 7:
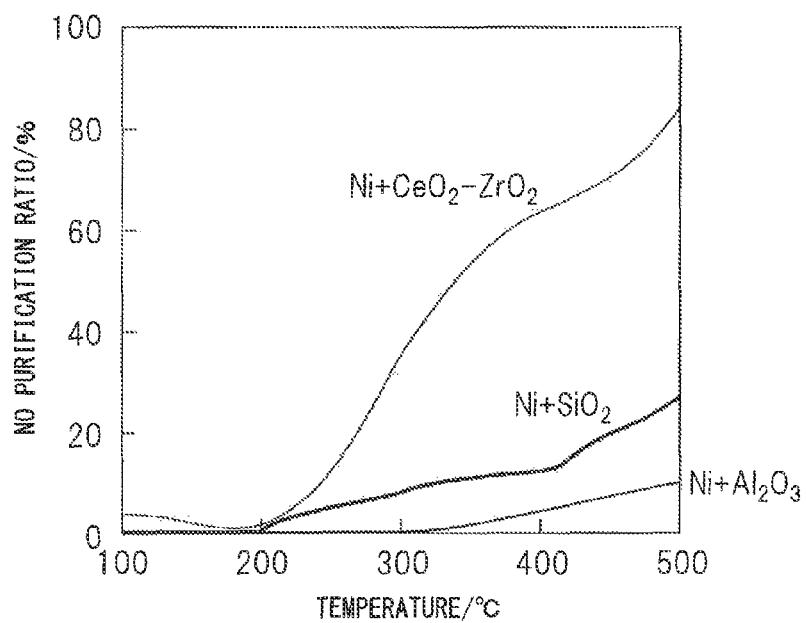
FIG. 7 is a graph indicating comparison of the NO reducing activities of mixed powders of the respective carrier oxides with the Ni-supported catalyst.
Figure 8:
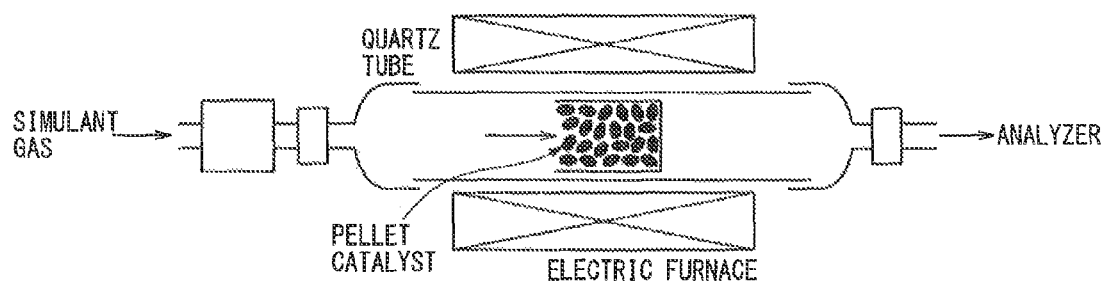
FIG. 8 is a schematic view of the device used to measure the activity of the catalyst.

Further, as one measurement item of the catalyst evaluation, the activity was measured using the device shown in FIG. 7. Note that, the following measurement method is shown by way of example and the activity can be measured by a method which is to be considered equivalent for a person skilled in the art.

Further, in the respective examples below, the following base metal-supported catalysts were used.

Ni/$CeO_2$—$ZrO_2$ catalyst powder: Average particle size: 10 μm, Amount of Ni supported: 4 mass %)

Cu/$CeO_2$—$ZrO_2$ catalyst powder: Average particle size: 20 μm, Amount of Cu supported: 5 mass %)

Further, the honeycomb substrate used was a honeycomb substrate made of cordierite; a partition wall shape: square.

Further, as the device for coating the honeycomb substrate, there was used a coating device provided with a function of reducing pressure to suction-apply a slurry.

Reference Example 1 and Comparative Reference Example 1

9 g of a catalyst powder was introduced in 21 g of pure water and stirred at room temperature. A pH electrode was inserted. Acetic acid, nitric acid, or ammonia water was added dropwise to adjust to the pH shown in FIG. 1. The solution was left standing for 1 hour.

The amount of solution was calculated from the difference in mass for each vessel.

After filtering and sampling the filtrate, the Ni concentration in the solution was measured by ICP analysis, and the Ni elution ratio was obtained from the following equation.

Ni elution ratio=Ni concentration in solution×amount of solution

The obtained results are shown together in FIG. 1.

FIG. 1 reveals that the Ni elution ratio was high when the pH of the aqueous solution was less than 7.

Similar results were obtained regarding Cu.

Example 1

1. Preparation of Ce Salt Sol

Cerous carbonate or cerium ammonium nitrate was reacted with hydrogen peroxide water and ammonia to prepare a cerium dioxide gel. The cerium dioxide gel was added with water and ammonia, and was heated at 100° C. or less for deflocculation treatment to obtain a cerium dioxide sol. The obtained sol was ultrafiltered to remove acid, thereafter, was added with water, citric acid, and ammoria, and was dispersed to obtain a Ce salt sal having a concentration of 10 mass %.

2. Preparation of Slurry

A predetermined amount of the aforementioned ammonium Ce sal (dispersant: citric acid) was weighed in a vessel and was stirred. Meantime, a $Ni/CeO_2$—$ZrO_2$ catalyst powder was weighed to meet the specified amount of 189 g/L, was inserted where the Ce salt binder was stirred. The amount of binder or $Ni/CeO_2$—$ZrO_2$ catalyst powder was slightly adjusted while measuring the viscosity. The ph was measured and adjusted with ammonia water so that the pH was 8.0. After stirring, a normal amount of balls were put in a pulverizer, and milling was performed. The particle size distribution was measured, and milling was performed until the average particle size reached approximately 5 to 6 μm. After milling was terminated, the slurry was recovered. The total amount of the slurry (3691 g) was composed of 1520 g of $Ni/CeO_2$—$ZrO_2$ catalyst powder and 2171.4 g of the inorganic binder sol having a concentration of 10%. The ratio of an inorganic binder to the supported catalyst powder was 15 mass %.

3. Production and Activity Evaluation of the Catalyst

The slurry prepared as stated above was dried at 120° C. Thereafter, pulverization and calcination at 300° C. for 5 hours in the air were performed. The obtained powder was pressed to prepare an approximately 1 mm catalyst pellet [Catalyst: Ce salt (1)].

The catalyst pellet was put into a reaction tube. A model gas was passed through under the following evaluation conditions. The composition of the passed gas was analyzed by FT-IR. From the results, the temperature for 50% purification of NO was obtained.

Evaluation Conditions

Amount of catalyst: 0.6 g, gas flow rate: 1 $Lmin^{-1}$, SV: 100000 $h^{-1}$, Temperature range: 50 to 500° C., rate of temperature increase: 20° C. $min^{-1}$ Gas composition: NO 3000 ppm, CO 3000 ppm, and $N_2$ balance The obtained activity evaluation results are shown in FIG. 2 together with other results.

4. Preparation of a Catalyst Comprising a Base Metal-Supported Catalyst Powder Coated on a Honeycomb Substrate The solid content and viscosity of the slurry were measured, the target adhesion quantity (150 g/L) was calculated, the mass of the honeycomb substrate before coating was measured, and the side to be coated was determined. While the slurry was filtered with a sieve, an amount was weighed in the range of 3 to 5 times the target adhesion quantity. The honeycomb substrate was immersed in pure water and shaken in the water. After shaking off the water, the substrate was pulled by a coating device at 60 Hz for 15 seconds.

The mass of the honeycomb substrate pretreated with water was measured, and the mass was set to 0. While the slurry was stirred by hand, the honeycomb substrate was pulled at 50 Hz for approximately 5 seconds, and the opposite side of the honeycomb substrate was pulled for 0.6 seconds. The slurry attached around the honeycomb substrate was wiped and the adhesion quantity was measured. When there was clogging, circulation drying was performed while air was lightly blown. After performing circulation drying for 30 minutes, calcination was performed at 250° C. for 1 hour, and the deviation from the target adhesion quantity was confirmed. If the adhesion quantity was less than the target adhesion quantity, the coating was performed again from the opposite side in the same manner as the first time. Finally, firing was performed in the air at 300° C. for 5 hours to obtain a catalyst coated with a base metal-supported catalyst powder.

5. Peeling Testing of the Catalyst Comprising a Honeycomb Substrate Coated with a Ni-Supported Catalyst Powder A sample of 18 mm square was cut out from a honeycomb substrate of the catalyst coated with a Ni-supported catalyst powder, and unevenesses were removed with sandpaper and a wire brush from the side surface of the cut-out sample. The sample was placed in a beaker containing pure water and was shaken 10 times to remove chips. The sample was dried in a dryer at 180° C. for 1 hour and the mass of the sample was measured (W1). The sample was placed in a crucible, and was fired at 900° C. for 5 hours. The sample was set in a fixing tool and placed in ion exchange water, and an ultrasound treatment was performed for 10 minutes. The sample was dried at 180° C. for 1 hour and the mass of the sample was measured (W2). The coat peeling ratio was obtained using the following equation.

The coat peeling ratio (%)=[(W1−W2)/W1]×100

The obtained results are shown together with other results in FIG. 4.

Example 2

A slurry set to a pH of 8.0 and catalyst pellets [Catalyst: Al salt] were prepared in the same manner as in Example 1 except that Al salt (salt: hydroxide, namely, boehmite) was used in place of cerium salt sol as the binder, and lactic acid and ammonia were used as the dispersant. The catalyst pellets were used to measure the temperature for 50% purification of NO. The activity evaluation results obtained are shown together with other results in FIG. 2.

Further, a catalyst coated with the Ni-supported catalyst powder was obtained in the same manner as in Example 1 except that the aforementioned slurry was used.

A honeycomb substrate of the catalyst coated with the Ni-supported catalyst powder was used to obtain the coat peeling ratio.

The obtained results are shown together with other results in FIG. 4.

Example 3

A slurry set to a pH of 9.0 and catalyst pellets [Catalyst: Si salt] were prepared in the same manner as in Example 1 except that Si salt (salt: hydroxide) was used in place of cerium salt sol as the binder, and ammonia was used as the dispersant. The catalyst pellets were used to measure the temperature for 50% purification of NO.

The activity evaluation results obtained are shown together with other results in FIG. 2.

Further, a catalyst coated with the Ni-supported catalyst powder was obtained in the same manner as in Example 1 except that the aforementioned slurry was used. A honeycomb substrate of the catalyst coated with the Ni-supported catalyst powder was used to obtain the coat peeling ratio. The obtained results are shown together with other results in FIG. 4.

Example 4

A slurry set to a pH of 7.0 and catalyst pellets [Catalyst: Ce salt (2)] were prepared in the same manner as in Example 1 except that Ce salt (salt: hydroxide) was used in place of cerium salt sol as the binder, and $NaPO_3$ was used as the dispersant. The catalyst pellets were used to measure the temperature for 50% purification of NO.

The activity evaluation results obtained are shown together with other results in FIG. 2.

Further, a catalyst coated with the Ni-supported catalyst powder was obtained in the same manner as in Example 1 except that the aforementioned slurry was used. A honeycomb substrate of the catalyst coated with the Ni-supported catalyst powder was used to obtain the coat peeling ratio. The obtained results are shown together with other results in FIG. 4.

Example 5

A slurry set to a pH of 7.0 and catalyst pellets [Catalyst: Zr salt] were prepared in the same manner as in Example 1 except that Zr salt (salt: ammonium) was used in place of cerium salt sol as the binder, and citric acid and ammonia were used as the dispersant. The catalyst pellets were used to measure the temperature for 50% purification of NO.

The activity evaluation results obtained are shown together with other results in FIG. 2.

Further, a catalyst coated with the Ni-supported catalyst powder was obtained in the same manner as Example 1 except that the aforementioned slurry was used. A honeycomb substrate of the catalyst, coated with the Ni-supported catalyst powder was used to obtain the coat peeling ratio. The activity evaluation results obtained are shown together with other results in FIG. 4.

Example 6

A slurry set to a pH of 7.0 and catalyst pellets [Catalyst: None] were prepared in the same manner as in Example 1 except that a binder was not used while citric acid and ammonia were used as the dispersant. The catalyst pellets were used to measure the temperature for 50% purification of NO.

The activity evaluation results obtained are shown together with other results in FIG. 2.

Further, a catalyst coated with the Ni-supported catalyst powder was obtained in the same manner as in Example 1 except that the aforementioned slurry was used. A honeycomb substrate of the catalyst coated with the Ni-supported catalyst powder was used to obtain the coat peeling ratio. The activity evaluation results obtained are shown together with other results in FIG. 4.

Examples 7 to 10

A slurry and catalyst pellets [Catalyst: Ce salt (1), Example 7], [Catalyst: Al salt, Example 8], [Catalyst: Zr salt, Example 9], and [Catalyst: None, Example 10] were prepared in the same manner as Example 1, Example 2, Example 5, or Example 6, except that a $Cu/CeO_2$—$ZrO_2$ catalyst powder was used in place of the $Ni/CeO_2$—$ZrO_2$ catalyst powder as the base metal-supported catalyst. The catalyst pellets were used to measure the temperature for 50% purification of NO. The activity evaluation results obtained are shown together with other results in FIG. 3.

Reference Example 2

To study the principle of exhaust gas purification activity of the base metal catalyst for exhaust gas purification of the present invention, the Ni metal state was observed by EXAFS (extended X-ray absorption fine structure) measurement for the Ni-based catalyst (nickel oxide)+$CeO_2$—$ZrO_2$, the Ni-based catalyst 4 and the Ni-based catalyst+$Al_2O_3$, which were each obtained by evaporative drying a solution of both components at a mass ratio of Ni-based catalyst:oxide=1:20 for supporting the catalyst. The results are shown together in FIG. 5.

Figure 5:
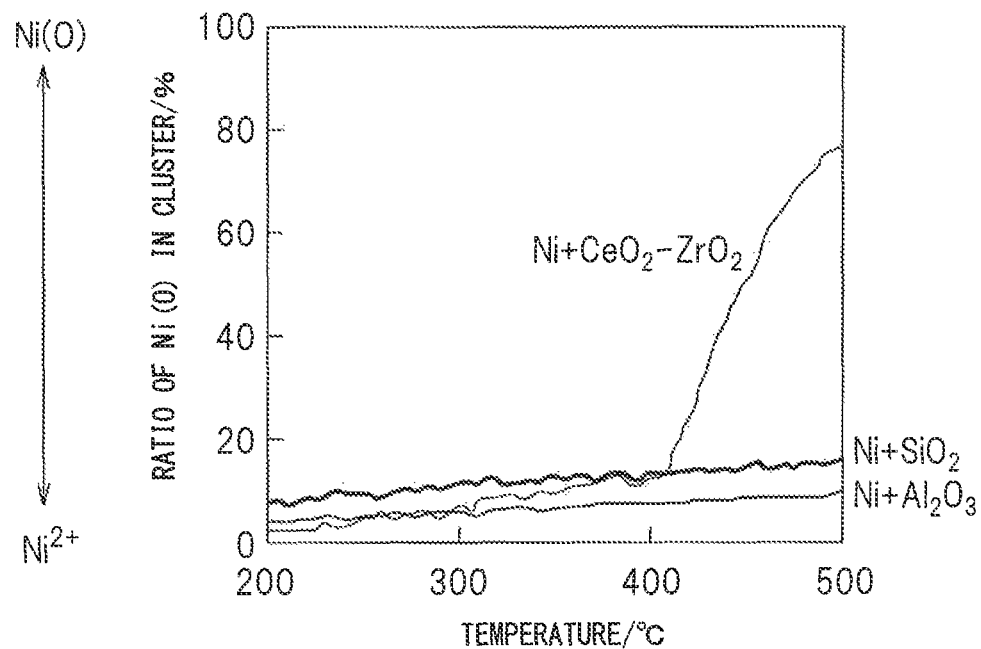
FIG. 5 is a graph indicating by comparison the relationship between the types of base metal and carrier and the metal state to study the principle of the catalyst activity of the base metal catalyst for exhaust gas purification of the present invention.

From FIG. 5, it is understood that Ni directly changed to a Ni metal state in the catalyst in which $CeO_2$—$ZrO_2$ existed.

The same tendency of the results was obtained for Cu.

Reference Example 3

Figure 6:
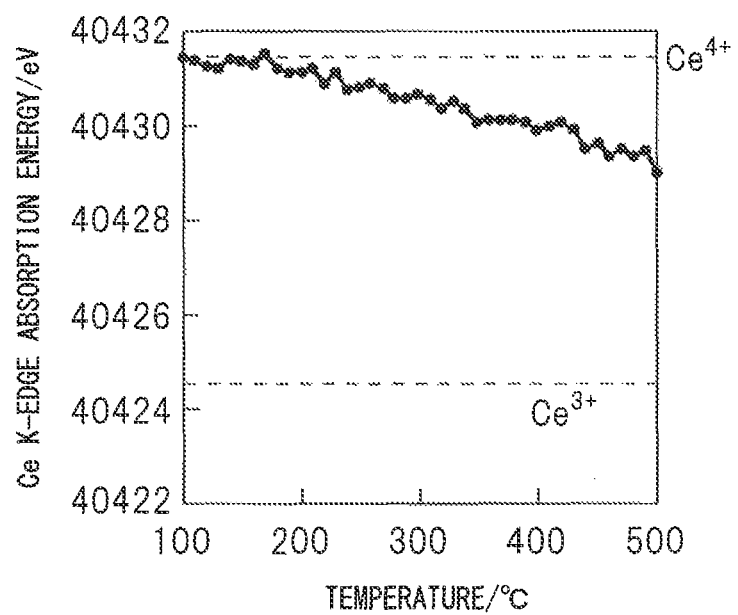
FIG. 6 is a graph indicating the temperature dependence of the Ce valence state in the $CeO_2$—$ZrO_2$ carrier.

The Ce valence state in $CeO_2$—$ZrO_2$ was measured in the actual gas atmosphere by XAFS analysis. FIG. 6 shows the results in a graph with CeK absorption edge energy on the vertical axis and measurement temperature on the horizontal axis.

From FIG. 6, it is understood that the valence of Ce changed from tetravalent to trivalent in the presence of $CeO_2$—$ZrO_2$.

Reference Example 4

The NO purification rate was measured for the catalyst obtained in Reference example 1. The results are shown in FIG. 7.

From FIGS. 5 to 7, it is understood that when the cerium oxide-including powder coexisted with a base metal, such as iron, cobalt, nickel, molybdenum, tungsten, zinc, magnesium, manganese, vanadium, and copper, the valence of the cerium oxide chanced, and the base metal changed to a metal state, and thus, a specifically high purification activity was exhibited.

Further, it is understood that it is important to select a binder or carrier which prevents a base metal from forming a compound on a honeycomb substrate since Ni and aluminum oxide easily form Ni aluminate.

INDUSTRIAL APPLICABILITY

According to the production method of the present invention, a base metal-supported catalyst is uniformly supported by a honeycomb substrate whereby a base metal catalyst for exhaust gas purification and with catalyst activity can be easily obtained.

The invention claimed is:

1. A method of producing a catalyst for exhaust gas purification, in which a base metal-supported catalyst is coated on a honeycomb substrate, comprising:
    preparing a honeycomb substrate having a plurality of cells;
    preparing a base metal-supported catalyst comprising a metal containing a base metal having an exhaust gas purification performance supported by a carrier;
    dispersing the base metal-supported catalyst and an inorganic binder consisting of one or a mixture of cerium salt and zirconium salt in an aqueous solution to prepare a slurry having a pH of 7 or more; and
    introducing the slurry to a partition wall surface of the honeycomb substrate.

2. The method according to claim 1, wherein the inorganic binder is contained at a ratio of inorganic binder to base metal-supported catalyst (inorganic binder/base metal-supported catalyst) of 10 to 30 mass %.

3. The method according to claim 1, wherein the base metal having an exhaust gas purification performance is iron, cobalt, nickel, molybdenum, tungsten, zinc, magnesium, vanadium, or copper.

4. The method according to claim 1, wherein the slurry has a pH of 7 to 9.

5. The method according to claim 1, wherein the carrier comprises one selected from $Al_2O_3$, $SiO_2$, $MgO$, $CeO_2$, $ZrO_2$, and $TiO_2$, a mixture of two or more thereof, or a composite oxide of two or more thereof.

6. The method according to claim 1, further comprising a step of drying for removing water, and a step of firing the base metal-supported catalyst.

7. The method according to claim 1, wherein the base metal catalyst for exhaust gas purification is in use for $NO_x$ purification of an exhaust gas.

* * * * *